(12) United States Patent
Zhang et al.

(10) Patent No.: US 9,825,558 B2
(45) Date of Patent: Nov. 21, 2017

(54) VIBRATION GENERATOR AND STACKED-STRUCTURE GENERATOR

(71) Applicant: PEKING UNIVERSITY, Beijing (CN)

(72) Inventors: Haixia Zhang, Beijing (CN); Wei Tang, Beijing (CN); Bo Meng, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 240 days.

(21) Appl. No.: 14/762,135

(22) PCT Filed: Feb. 5, 2013

(86) PCT No.: PCT/CN2013/071372
§ 371 (c)(1),
(2) Date: Jul. 20, 2015

(87) PCT Pub. No.: WO2014/110849
PCT Pub. Date: Jul. 24, 2014

(65) Prior Publication Data
US 2015/0318800 A1    Nov. 5, 2015

(30) Foreign Application Priority Data

Jan. 21, 2013   (CN) .......................... 2013 1 0022144

(51) Int. Cl.
*H02N 1/04* (2006.01)
*H02N 1/00* (2006.01)
*H01L 41/27* (2013.01)

(52) U.S. Cl.
CPC ..................... *H02N 1/04* (2013.01)

(58) Field of Classification Search
CPC ................... H02N 1/04; H02N 1/00
(Continued)

(56) References Cited

U.S. PATENT DOCUMENTS

| 6,349,141 | B1* | 2/2002 | Corsaro | H04R 17/005 310/311 |
| 2012/0133247 | A1* | 5/2012 | Lee | H01L 41/183 310/339 |

FOREIGN PATENT DOCUMENTS

| CN | 101604930 | 12/2009 |
| CN | 102683573 | 9/2012 |

(Continued)

OTHER PUBLICATIONS

Machine Translation CN102684546 (Sep. 2012).*
(Continued)

*Primary Examiner* — Jose Gonzalez Quinones
(74) *Attorney, Agent, or Firm* — Hamre, Schumann, Mueller & Larson, P.C.

(57) ABSTRACT

The disclosure discloses a vibration generator and a stacked-structure generator. The vibration generator includes an arched friction unit 1 and an arched friction unit 2. An concave inner surface of the arched friction unit 1 and an concave inner surface of the arched friction unit 2 are located opposite to each other as friction surfaces; and, the arched friction units 1 and 2 are provided with electrodes at convex outer surfaces thereof, which are concurrently served as supporting layers. The stacked-structure generator includes a plurality of the vibration generators, and several sets of a first geometrically complementary-shaped friction unit, which matches the electrode of the vibration generator that is concurrently served as the supporting layer, and a second geometrically complementary-shaped friction unit. The first geometrically complementary-shaped friction unit and the electrode concurrently served as the supporting layer that is coupled thereto and the second geometrically complementary-shaped friction unit and the electrode concurrently served as the supporting layer that is coupled thereto are attached to form a vibration generator that is complementary (Continued)

to the vibration generator. The present disclosure greatly increases output voltage of the generator and effectively increases collection and usage of environment energy.

14 Claims, 5 Drawing Sheets

(58) Field of Classification Search
USPC .................................................. 310/308–311
See application file for complete search history.

(56) References Cited

FOREIGN PATENT DOCUMENTS

| CN | 102684546 | | 9/2012 | |
|----|-----------|---|--------|---|
| CN | 102684546 A | * | 9/2012 | ............... H02N 1/04 |
| JP | 2007157646 | | 6/2007 | |

OTHER PUBLICATIONS

International Search Report issued in the corresponding International Application No. PCT/CN2013/071372, dated Oct. 24, 2013, 2 pages.
Park et al., "Bulk heterojunction solar cells with internal quantum efficiency approaching 100%", Nature Photonics, vol. 3, May 2009, pp. 297-303.
Chen et al., "Polymer Solar Cells with Enhanced Open-Circuit Voltage and Efficiency", Nature Photonics, vol. 3, Nov. 2009, pp. 649-653.
Wang et al., "Piezoelectric Nanogenerators Based on Zinc Oxide Nanowire Arrays", Science, vol. 312, Apr. 14, 2006, pp. 242-246.
Yang et al., "Power generation with laterally packaged electric fine wires", Nature Nanotechnology, vol. 4, Jan. 2009, pp. 34-39.
Chang et al., "Direct-Write Piezoelectric Polymeric Nanogenerator with High Energy Conversion Efficiency", Nano Letters, vol. 10, Feb. 2010, pp. 726-731.
Hochbaum et al., "Enhanced thermoelectric performance of rough silicon nanowires", Nature Letters, vol. 451, Jan. 10, 2008, pp. 163-168.
Snyder et al., "Complex thermoelectric materials", Nature Materials, vol. 7, Feb. 2008, pp. 105-114.
Fan et al., "Flexible triboelectric generator!", Nano Energy, vol. 1, 2012, pp. 328-334.
Fan et al., "Transparent Triboelectric Nanogenerators and Self-Powered Pressure Sensors Based on Micropatterned Plastic Films", Nano Letters, 2012, pp. 3109-3114.
Zhu et al., "Triboelectric-Generator-Driven Pulse Electrodeposition for Micropatterning", Nano Letters, 2012, pp. 4960-4965.
Wang et al., "Nanoscale Triboelectric-Effect-Enabled Energy Conversion for Sustainably Powering Portable Electronics", Nano Letters, 2012, pp. 6339-6346.

* cited by examiner aluminum | polyimide | PDMS | silicon oxide | electrode a first friction unit 1
a second friction unit 2
electrode layer doubled as a supporting layer ▓ a first friction unit 1
▨ a second friction unit 2
▨ electrode layer doubled as a supporting layer ▓ a first friction unit 1    ▨ a second friction unit 2

▧ electrode layer doubled as a supporting layer (a)

(b)

(c)

VIBRATION GENERATOR AND STACKED-STRUCTURE GENERATOR

BACKGROUND

Technical Field

The present invention relates to a vibration generator and a stacked-structure generator that provide an electrical energy self-supplying approach for Internet of Things, implanted medical devices and portable electronic devices. That is, the present invention relates to a generator and its application, which is designed to, based on electrostatic induction effect, capture energy from mechanical motion, vibration, collision and friction in daily life.

Description of the Related Art

Recently, the developing Internet of Things needs a large number of sensors distributed at various locations. A difficult point of implementing this technology is to supply electrical energy to these sensors at distributed locations. Further, in medical field, it is common to implant chip(s) in an organism body. However, an obstacle for implanted therapeutics technology is how to continuously supply electrical energy to the implanted chip(s). In addition, it is needed to supply electrical energy for portable electronic devices in daily life, such as ipad, iphone, electronic book, notebook computer. In this circumstance, a new concept of energy self-capturing or energy self-powering is provided to address the current problems. Currently, researches focused on this and proposed nanoscale generators based on photoelectricity (referring to Park, S. H. et al. Bulk heterojunction solar cells with internal quantum efficiency approaching 100%. *Nature Photonics* 3, 297-302 (2009); Chen, H. Y. et al. Polymer solar cells with enhanced open-circuit voltage and efficiency. *Nature Photonics* 3, 649-653 (2009)), piezoelectric effect (referring to Wang, Z. L. and Song, J. H. Piezoelectric nanogenerators based on zinc oxide nanowire arrays. *Science* 312, 242-246 (2006); Yang R., Qin Y., Dai L. M. and Wang Z. L., Power generation with laterally packaged piezoelectric fine wires. *Nature Nanotechnology* 4, 34-39 (2009); Chang, C., Tran, V. H., Wang, J. B., Fuh, Y. K. and Lin, L. W. Direct-write piezoelectric polymeric nanogenerator with high energy conversion efficiency. *Nano Lett* 10, 726-731 (2010).) and thermoelectric effect (referring to Hochbaum, A. I. et al. Enhanced thermoelectric performance of rough silicon nanowires. *Nature* 451, 163-167 (2008); Snyder, G. J. and Toberer, E. S. Complex thermoelectric materials. Nature Materials 7, 105-114 (2008)).

A electrostatic induction based generator is also reported recently (referring to Fan, F. R., Tian, Z. Q., Wang, Z. L. Nano Energy 1, 328-334 (2012); Fan, F. R. et al. Transparent triboelectric nanogenerators and self-powered pressure sensors based on micropatterned plastic films. *Nano Letters* 12, 3109-3114 (2012); Zhu, G. et al. Triboelectric-generator-driven pulse electrodeposition for micropatterning. *Nano Letters* 12, 4960-4965 (2012); Wang, S., Lin, L. and Wang, Z. L. Nanoscale triboelectric-effect-enabled energy conversion forsustainably powering portable electronics. *Nano Letters* 12, 6339-6346 (2012).). This type of triboelectric generator may achieve an output voltage of 230 volt and an output power of 9 mW (i.e., 3.56 mW/cm$^2$) by means of an arched structure (as shown in FIG. 1) (referring to Wang, S., Lin, L. and Wang, Z. L. Nanoscale triboelectric-effect-enabled energy conversion forsustainably powering portable electronics. *Nano Letters* 12, 6339-6346 (2012)). However, in practice, the arched structure is not in favor of absorption of energy from the environment.

SUMMARY OF THE DISCLOSURE

Aiming to the problems in prior art, it is objective to provide an electrostatic induction based generator, which captures energy produced in mechanical motion, vibration, collision and friction in environment.

The technical schemes of the present disclosure are provided as below:

A vibration generator, characterized by comprising an arched friction unit 1 and an arched friction unit 2, wherein an concave inner surface of the arched friction unit 1 and an concave inner surface of the arched friction unit 2 are located to face each other as friction surfaces; and, an electrode doubled as a supporting layer is provided on a convex outer surface of the arched friction unit 1, and an electrode doubled as a supporting layer is provided on a convex outer surface of the arched friction unit 2.

A vibration generator, characterized by comprising an arched friction unit 1 and an arched friction unit 2, wherein an convex outer surface of the arched friction unit 1 and an convex outer surface of the arched friction unit 2 are located to face each other as friction surfaces; and, an electrode doubled as a supporting layer is provided on a concave outer surface of the arched friction unit 1, and an electrode doubled as a supporting layer is provided on a concave outer surface of the arched friction unit 2.

Further, the arched friction unit 1 is coupled to the electrode doubled as the supporting layer by an insulating bonding layer; and, the arched friction unit 2 is coupled to the electrode doubled as the supporting layer by an insulating bonding layer.

Further, the electrode doubled the supporting layer is a metal plate electrode and the insulating bonding layer is made by an adhesive.

Further, the inner friction surface of the arched friction unit 1 comprises micro/nanoscale pattern structures or is a smooth surface; and the inner friction surface of the arched friction unit 2 comprises micro/nanoscale pattern structures or is a smooth surface.

Further, the arched friction unit 1 is made by polydimethylsiloxane, the arched friction unit 2 is made by polyethylene glycol terephthalate, and the electrodes doubled as the supporting layers are aluminumaluminum foil.

A stacked-structure generator, characterized by comprising a plurality of the vibration generators according to claim 1, and several sets of first geometrically complementary-shaped friction units and second geometrically complementarily-shaped friction units, which match with the electrodes doubled as the supporting layers of the vibration generator; wherein the plurality of vibration generators are coupled to each other through a set of the first geometrically complementarily-shaped friction unit and the second geometrically complementarily-shaped friction unit; and the first geometrically complementarily-shaped friction unit and the electrode doubled as the supporting layer that is coupled thereto, and the second geometrically complementarily-shaped friction unit and the electrode doubled as the supporting layer that is coupled thereto, which connect two vibration generators, compose a vibration generator that is complementary to the two vibration generator.

Further, the first complementarily-shaped friction unit is coupled to the electrode doubled as the supporting layer by an insulating bonding layer, and the second complementarily-shaped friction unit is coupled to the electrode doubled as the supporting layer by an insulating bonding layer.

Further, a surface of the first complementarily-shaped friction unit facing the second complementary-shaped friction unit comprises micro/nanoscale pattern structures or is a smooth surface; and, a surface of the second complementary-shaped friction unit facing the first complementarily-shaped friction unit comprises micro/nanoscale pattern structures or is a smooth surface.

Further, the plurality of vibration generators are fastened together by an attaching strip or an attaching line.

Compared to the prior art, the present disclosure has advantages as below:

The present disclosure is developed based on a single-cell generator. The single-cell generator in prior arts is produced by forming an arched structure by using a stress difference between a polyimide and a silicon oxide and then adding a friction layer and an electrode at either side of the arched structure. In the present disclosure, a pre-bending aluminum foil is used as an electrode layer and the arched structure, which eliminates steps of molding and separates selection of materials for the supporting layer, allowing selecting optimal suitable material for the supporting layer and providing better reliability and flexibility for the generator while achieving packaging of the generator.

The present disclosure provides a novel complementary single-cell generator, which is perfectly geometrically complementary to the arched structure while maintaining excellent properties of the single-cell generator.

The present disclosure provides a generator in spring-shaped stacked structure, which may absorb an impacting energy from the environment more effectively compared to a single-cell generator and thus may obtain higher energy output. The resulting generator by stacking the geometrically complementary structures presents output values of performance two times better than a generator that is obtained by simply stacking the single-cell generators, thereby increasing energy output value in unit area/unit volume and saving material and fabricating expense. Specifically, a generator with only double stacked layers may output a voltage up to 760 volt and a power of 38 mW (i.e., 10.1 mW/cm$^2$), which is far better than other micro-generators. By using the modern industrial technology, a stacked generator may have an increased stacking number and thus have largely increased output, and may be put into practice to effectively capture and collect energy from environment.

The present disclosure will lead to a new important industry in energy field. With power consumption of electronic devices being decreasing, the generator in the present disclosure might absolutely change the energy supplying manner of the modern portable electronic devices and solve the difficulty of maintaining a device standing by in a long period of time, and even may be widely used in a plurality of apparatuses and the related fields that need provision of electrical power over a long period of time. The applications are exemplarily illustrated as below.

1. Energy supply for a portable electronic device: supplying electrical energy to a battery of a portable device, such as a smart mobile phone, tablet, electronic book, etc. such that the portable electronic device may stand by within a longtime period or be free of charge. Examples are provided as below:

a) The generator may be fabricated as a transparent film bonding to a touch screen. The generator may generate electrical energy when the screen is touched, and supply power to the touch screen. The surplus electrical energy may be used to charge its battery. In a normal state, the generator receives vibration in surroundings to generate electrical energy to charge its battery.

b) The generator may be fabricated as a charging rear cover of a mobile phone, which is coupled to a circuit of the phone and thus charges the phone;

c) The generator may be fabricated as an individual charging casing or a flat charging module attached to a rear face of a mobile phone, charging the mobile phone;

2. Power supply for a portable device. There are examples as below:

a) The generator is fabricated as a transparent film bonding to a touch screen. The generator may generate electrical energy when the screen is touched, and supply power to the touch screen. The surplus electrical energy may be used to charge a battery of the portable device. In a normal state, the generator receives vibration in surroundings to generate electrical energy to charge itsf battery;

b) A vibration energy micro-collector of this type is provided under a key board of a portable device and is coupled to a corresponding charging circuit, thereby charging the portable device when the key board is knocked;

c) The generator is fabricated as an individual key board film of a portable device, which may protect the key board while charging the portable device through receiving knocking actions on the key board.

3. Usage in Internet of Things. There are examples as below:

a) The generator is used to supply power to sensors (which are used for, such as, animal outdoor tracking, in-field management, ocean current/drainage monitoring, meteorological detection, environment monitoring, etc.) in the Internet of Things by collecting energy resulted from motions of the main body or the ground in environment and vibrations generated from flow motion of the air or water, avoiding replacing batteries and the time and labour consumption therefrom.

b) The generator in the present disclosure may be used as an active measurement sensor, which eliminates power demand and transform an object to be measured to electrical energy while performing collection and analysis;

c) The generator may be produced as RFID, in which a different inductance device is couple to the generator to achieve radio frequency identification by self powering, and thus has a wonderful prospect of application.

4. Usage in medical field. There are examples as below:

a) The generator is provided to generate high voltage pulses so as to stimulate and massage corresponding locations on body, such as acupoint, organ, achieving medical health care during daily walking while recording and storing corresponding feedback signals, and thus is used as a body caring manager;

b) The generator may be used to supply power to an implanted device by capturing vibration of the surroundings, avoiding risk and troublesome from replacing the implanted device periodically by surgery;

c) The generator may be used for an electronic cardiac pacemaker, wherein the beating of the heart leads to electrical voltage pulse and the electrical voltage pulse may be treated to react on the heart, building up a stable feedback mechanism to maintain normal and continuous beat of the heart.

5. Usage in other applications, such as an electrical generator floor, self-heated cushion, self-powered plaything, a tire pressure monitor system (TPMS) or the like.

BRIEF DESCRIPTION OF THE DRAWINGS

FIG. 2 is a schematic view and an output graph of a single electrostatic induction generator, in which

FIG. 3 is a schematic view and an output graph of a double-stacked electrostatic induction generator, in which

FIG. 4 is a schematic view and an output graph of a tri-stacked electrostatic induction generator, in which

FIG. 5 is a schematic view and a voltage output graph of a single complementary-shaped electrostatic induction generator, in which FIG. 5(a) is a structural view of the generator, FIG. 5(b) is a graph of voltage output verse time of the generator, and FIG. 5(c) is a graph of voltage output verse current of the generator;

Figure 1:
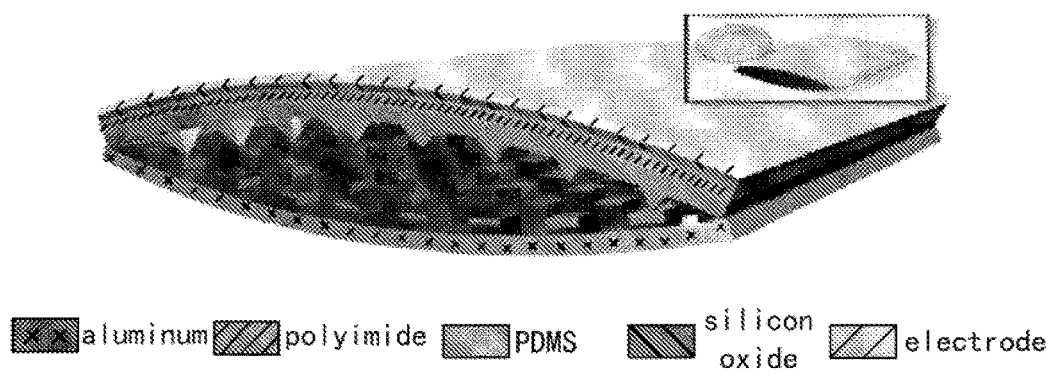
FIG. 1 is a structural view of a generator in prior arts.

In the drawings, reference numbers are listed as below: 1—a friction unit 1, 2—a friction unit 2, 3—an electrode and supporting layer (i.e., an electrode functioning as a supporting material layer), 4—a single-layer generator and 5—a single-layer complementary generator.

DETAILED DESCRIPTION OF THE EMBODIMENTS

A single electrostatic induction generator according to an embodiment of the present disclosure is described with reference to an exemplary arched stack structure. It is noted that the generator according to an embodiment of the present disclosure may be formed by stacking pieces that are in various shapes, and a cascade generators is not limited by those shown in FIGS. 3 and 4 with a cascade number of 2 or 3, but may include a plurality of generators that are cascaded.

FIG. 2 is a schematic diagram of a single arched electrostatic induction generator.

Figure 2A:
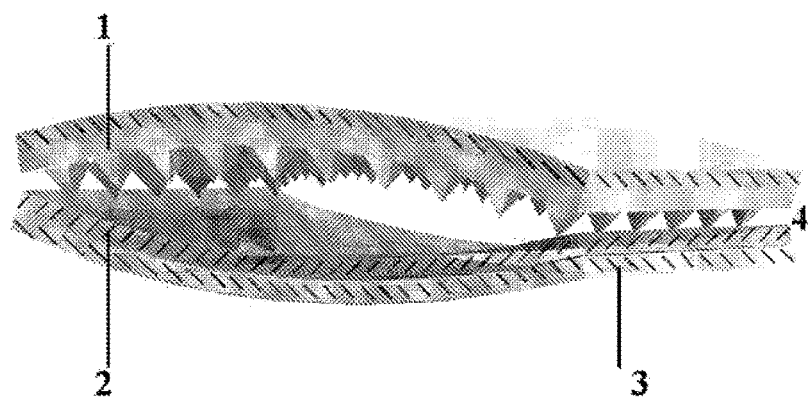
FIG. 2(a) is a structural view of the single electrostatic induction generator.
Figure 2B:
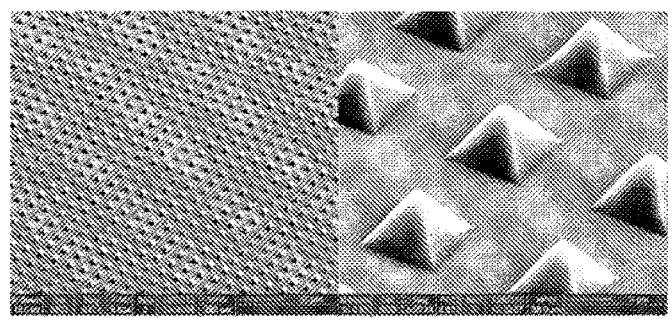
FIG. 2(b) is a structural view of a friction unit.

1. The component 1 in FIG. 2(a) is a friction unit 1, which is made by polydimethylsiloxane (PDMS). The friction unit 1 may be provided with a micro/nanoscale pattern thereon by a micro-machining method. For example, the micro/nanoscale pattern may be a pyramid, grating shaped slot, etc.

2. A friction unit 2 may be made by polyethylene glycol terephthalate (PET) and may be provided with a micro/nanoscale pattern thereon by a micro-machining method.

3. An electrode 3 may be a metal plate electrode, which, at the same time, is used as a supporting layer. The electrode 3 may be made by various materials, which may be selected to adjust and improve stiffness coefficient and reliability of the generator.

4. The components 1 and 3, and/or the components 2 and 3 may be bonded by an adhesive, which renders a simpler process compared to the prior arts.

Figure 2C:
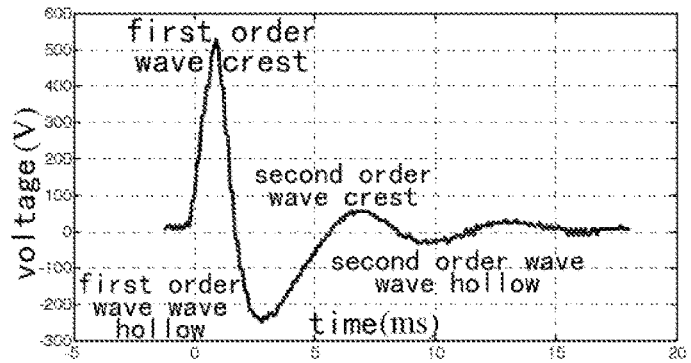
FIG. 2(c) is a graph of voltage output verse time of the generator.
Figure 2D:
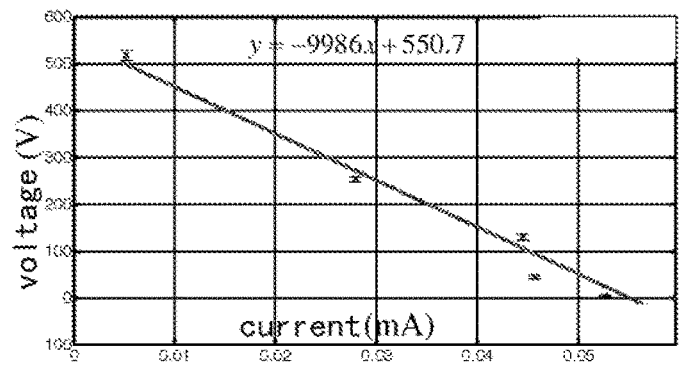
FIG. 2(d) is a graph of voltage output verse current of the generator.

5. In addition, compared to the prior arts, due to separation between the electrode and the friction unit, it is more convenient to select materials for them so as to optimize the generator with respect to its friction efficiency, stiffness coefficient and reliability. As shown in FIGS. 2(c) and 2(d) that illustrate output of the generator, it can be seen that the maximum output voltage of the generator is 518.4V, an internal resistance is about 10 Mohm and the maximum output power is 6.7 mW (i.e., 1.77 mW/cm$^2$).

Figure 5:
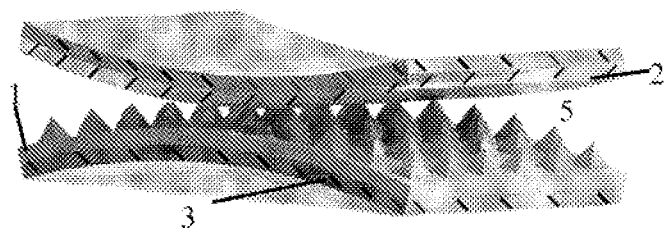
Figure 5:
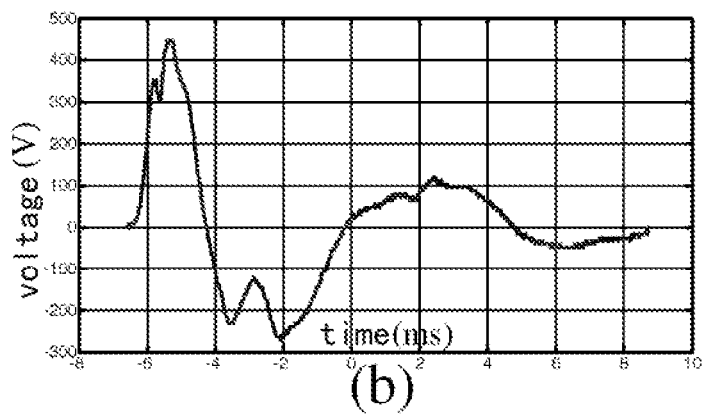
Figure 5:
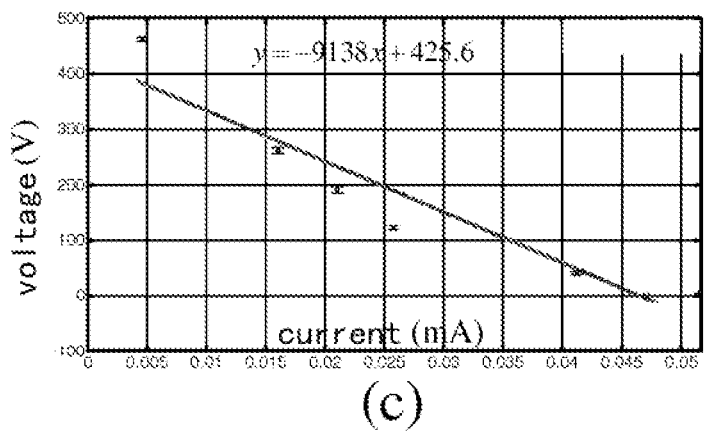

FIG. 5 is a schematic view of a simply inversely arched electrostatic induction generator.

1. The component 1 is the friction unit 1, which is made by polydimethylsiloxane (PDMS). The friction unit 1 may be provided with a micro/nanoscale pattern thereon by a micro-machining method. For example, as shown in FIG. 5(b), the micro/nanoscale pattern may be a pyramid, grating shaped slot, etc.

2. The friction unit 2 may be made by polyethylene glycol terephthalate (PET) and may be provided with a micro/nanoscale pattern thereon by a micro-machining method.

3. The electrode 3 may be a metal plate electrode, which, at the same time, is used as a supporting layer. The plate electrode 3 may be made by various materials, which may be selected to adjust and improve stiffness coefficient and reliability of the generator.

4. The components 1 and 3, and/or the components 2 and 3 may be bonded by an adhesive. A generator with this arrangement is not yet known currently.

5. FIGS. 5(b) and 5(c) are graphs of voltage output of the generator. It can be seen from the Figures that the maximum output voltage is 450V, an internal resistance is about 9 Mohm and the maximum output power is 5.6 mW (i.e., 1.5 mW/cm$^2$).

FIG. 3 is a schematic view of a double-stacked electrostatic induction generator.

1. The double-stacked structure includes two arched portions and an inverse arched portion. As shown in FIG. 3, the friction unit 1 is made by polydimethylsiloxane (PDMS) and the friction unit 2 is made by polyethylene glycol terephthalate (PET), the two materials are selected for obtaining an optimal combination for friction according to triboelectric series while being processed to obtain micro/nanoscale pattern structures thereon by a micro-machining method, such as a pyramid, grating shaped slot, etc. The electrode 3 is a metal electrode, which, at the same time, is used as a supporting layer. Each of the generators outputs an output voltage through a lead wire that is coupled to the electrode. The components 1 and 3, and the components 2 and 3 may be bonded by an adhesive.

2. Two arched portions are fastened together by an attaching strip or an attaching line.

Figure 3A:
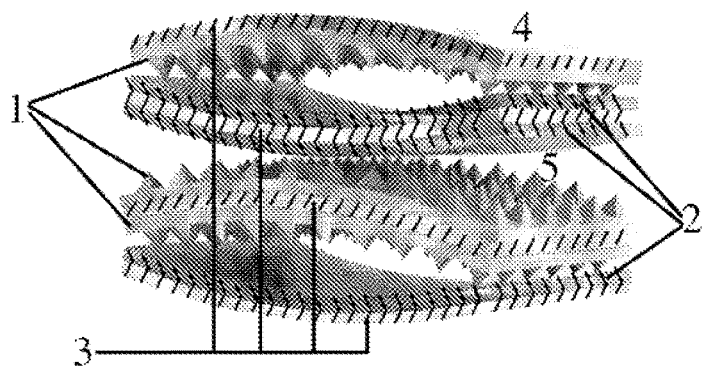
FIG. 3(a) is a structural view of the double-stacked electrostatic induction generator.
Figure 3B:
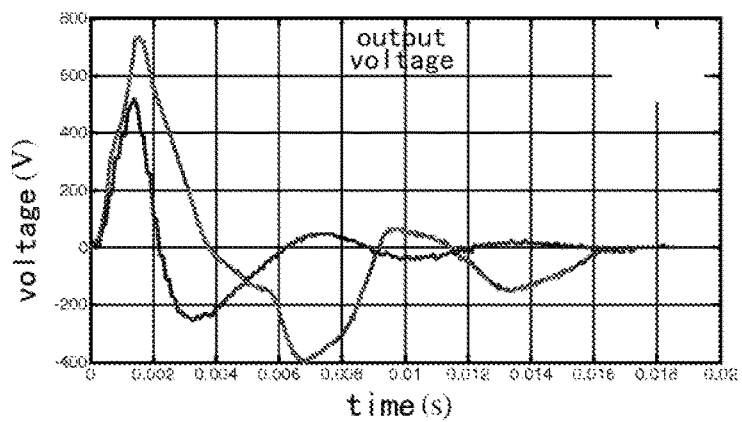
FIG. 3(b) is a graph of voltage output verse time of the generator.
Figure 3C:
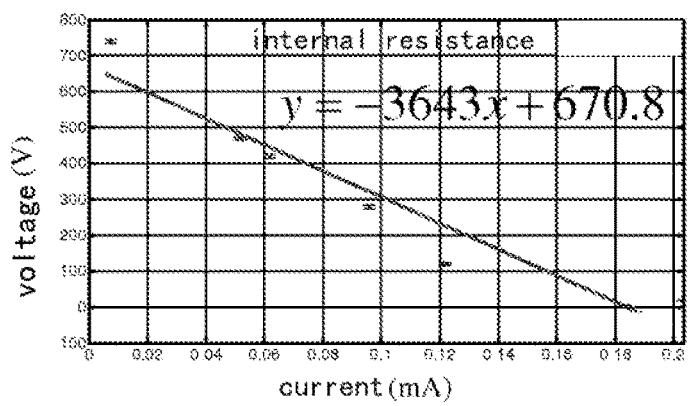
FIG. 3(c) is a graph of voltage output verse current of the generator.
Figure 3D:
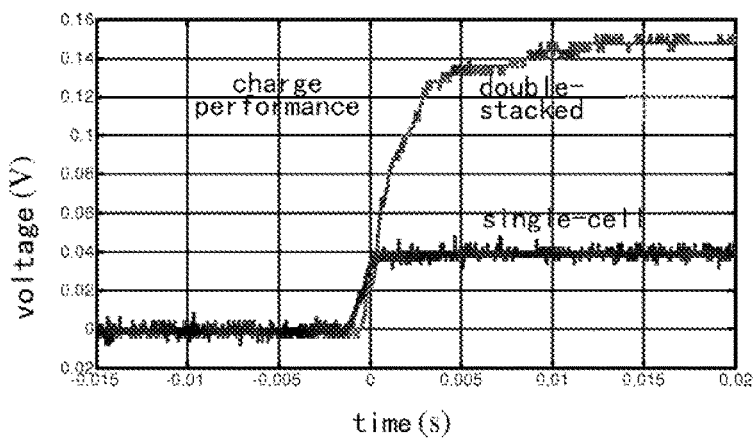
FIG. 3(d) is a graph of voltage output verse time of the two types of generators.

3. Through testing, compared to a single generator, an output capability of the double-stacked electrostatic induction generator is remarkably increased. As shown in FIG. 3(b)~(d), the double-stacked electrostatic induction generator has a maximum output voltage of 740 Volt, an internal resistance of about 3.6 Mohm (which is decreased to one-third with respect to that of the single generator) and thus a maximum output power of 38.0 mW (i.e., 10.1 mW/cm$^2$) (which is increased as six times as big as that of the single generator).

FIG. 4 is a schematic view of a tri-stacked electrostatic induction generator.

Figure 4A:
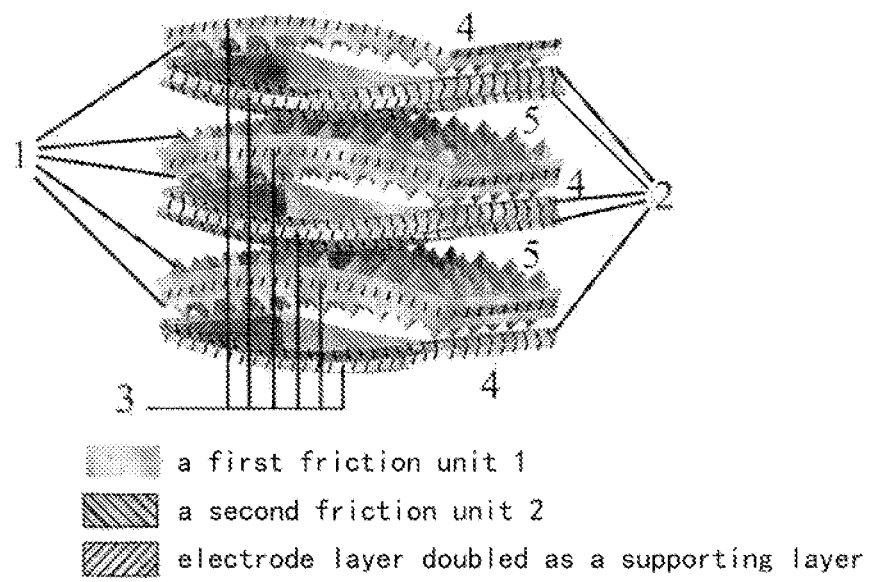
FIG. 4(a) is a structural view of the tri-stacked electrostatic induction generator.
Figure 4B:
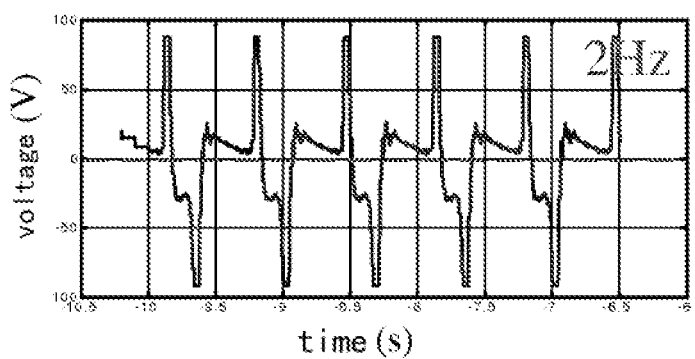
FIG. 4(b) is a graph of voltage output verse time of the generator.

1. The tri-stacked generator is configured in a similar structure as the double-stacked generator and includes three arched portions and two inversely arched portions. As shown in FIG. 4(a), similar to the above generators, the friction unit 1 is made by polydimethylsiloxane (PDMS) and the friction unit 2 is made by polyethylene glycol terephthalate (PET), the two materials are selected for obtaining an optimal combination for friction according to triboelectric-induction sequence while being processed to obtain micro/nanoscale pattern structures thereon by a micro-machining method, such as a pyramid, grating shaped slot, etc. The electrode 3 is a metal electrode, which, at the same time, is used as a supporting layer. The components 1 and 3, and the components 2 and 3 may be bonded by an adhesive. Each of the generators outputs an output voltage through a lead wire that is coupled to the electrode and the output end thereof is connected in parallel to others. A multiple-stacked electrostatic induction generator may be configured in the above manner. FIG. 4(b) shows an output voltage of the generator.

2. Multiple arched portions are fastened together by an attaching strip or an attaching line.

Figure 4C:
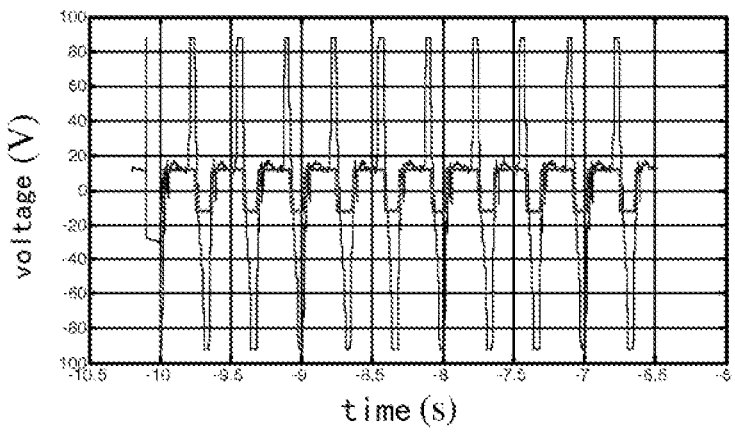
FIG. 4(c) is a graph of voltage output verse time of the generator.

3. A multiple-stacked electrostatic induction generator has another great advantage of longer time duration of outputting voltage and thus a continuous energy outputting capability. As shown in FIG. 4(c), upon externally knocked at 3 Hz, the generator continuously outputs a continuous rectangular wave signal of voltage with an amplitude up to 12 volt.

The invention claimed is:

1. A vibration generator, comprising:
  a first arched friction unit comprising a concave inner surface and a convex outer surface;
  a second arched friction unit comprising a concave inner surface and a convex outer surface;
  a first electrode configured as a supporting layer and provided on the convex outer surface of the first arched friction unit; and
  a second electrode configured as a supporting layer and provided on the convex outer surface of the second arched friction unit, wherein
  the concave inner surface of the first arched friction unit and the concave inner surface of the second arched friction unit face each other as friction surfaces.

2. The vibration generator according to claim 1, wherein
  the first electrode is coupled to the convex outer surface of the first arched friction unit by a first insulating bonding layer, and
  the second electrode is coupled to the convex outer surface of the second arched friction unit by a second insulating bonding layer.

3. The vibration generator according to claim 2, wherein
  each of the first electrode and the second electrode is a metal plate electrode, and
  each of the first insulating bonding layer and second insulating bonding layer is an adhesive.

4. The vibration generator according to claim 1, wherein
  the inner friction surface of the first arched friction unit comprises micro/nanoscale pattern structures or is a smooth surface, and
  the inner friction surface of the second arched friction unit comprises micro/nanoscale pattern structures or is a smooth surface.

5. The vibration generator according to claim 4, wherein
  the first arched friction unit comprises polydimethylsiloxane,
  the second arched friction unit comprises polyethylene glycol terephthalate, and
  the first electrode and the second electrode comprise aluminum foil.

6. A vibration generator, comprising:
  a first arched friction unit comprising a convex inner surface and a concave outer surface;
  a second arched friction unit comprising a convex inner surface and a concave outer surface;
  a first electrode configured as a supporting layer and provided on the concave outer surface of the first arched friction unit; and
  a second electrode configured as a supporting layer and provided on the concave outer surface of the second arched friction unit, wherein
  the convex inner surface of the first arched friction unit and the convex inner surface of the second arched friction unit face each other as friction surfaces.

7. The generator according to claim 6, wherein
  the first electrode is coupled to the concave outer surface of the first friction unit by a first insulating bonding layer, and
  the second electrode is coupled to the concave outer surface of the first friction unit by a second insulating bonding layer.

8. The generator according to claim 7, wherein
  each of the first electrode and the second electrode is a metal plate electrode, and
  each of the first insulating bonding layer and the second insulating bonding layer is an adhesive.

9. The vibration generator according to claim 6, wherein
  the convex inner friction surface of the first arched friction unit comprises micro/nanoscale pattern structures or is a smooth surface; and
  the convex inner friction surface of the second arched friction unit comprises micro/nanoscale pattern structures or is a smooth surface.

10. The vibration generator according to claim 9, wherein
  the first arched friction unit comprises polydimethylsiloxane,
  the second arched friction unit comprises polyethylene glycol terephthalate, and
  the first and second electrodes are aluminum plate electrodes.

11. A stacked-structure generator, comprising:
  a plurality of the vibration generators according to claim 1; and
  one or more sets of a first geometrically complementarily-shaped friction unit and a second geometrically complementarily-shaped friction unit, each of the first and second geometrically complementarily-shaped friction units matching with one of the first and second electrodes, wherein
  the plurality of vibration generators are coupled to each other by the one or more sets of the first geometrically complementarily-shaped friction unit and the second geometrically complementarily-shaped friction unit,
  the first geometrically complementarily-shaped friction unit being coupled to the matching one of the first and second electrodes and the second geometrically complementarily-shaped friction unit being coupled to the matching one of the first and second electrodes, the first and second geometrically complementarily-shaped friction units connecting two vibration generators of the plurality of vibration generators and compose a vibration generator that is complementary to one of the plurality of vibration generators.

12. The stacked-structure generator according to claim 11, wherein
  the first complementarily-shaped friction unit is coupled to the matching one of the first and second electrodes by a third insulating bonding layer, and the second complementarily-shaped friction unit is coupled to the matching one of the first and second electrodes by a fourth insulating bonding layer.

13. The stacked-structure generator according to claim 11, wherein
a surface of the first complementarily-shaped friction unit facing the second complementary-shaped friction unit comprises micro/nanoscale pattern structures or is a smooth surface, and
a surface of the second complementarily-shaped friction unit facing the first complementarily-shaped friction unit comprises micro/nanoscale pattern structures or is a smooth surface.

14. The stacked-structure generator according to claim 11, wherein the plurality of vibration generators are fastened together by an attaching strip or an attaching line.

* * * * *